(No Model.)
E. A. TRAPP.
OPTICAL DEVICE FOR THE OBSERVATION OF LOCALITIES BY REFLECTION.
No. 401,229. Patented Apr. 9, 1889.
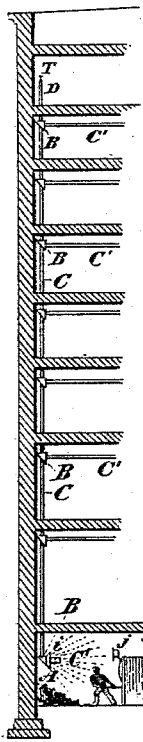
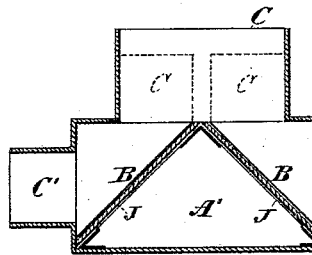
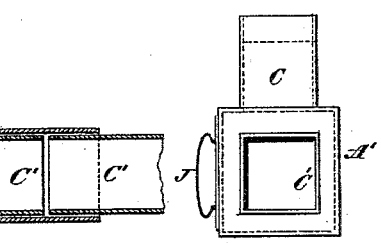
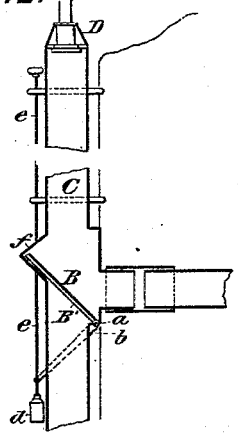
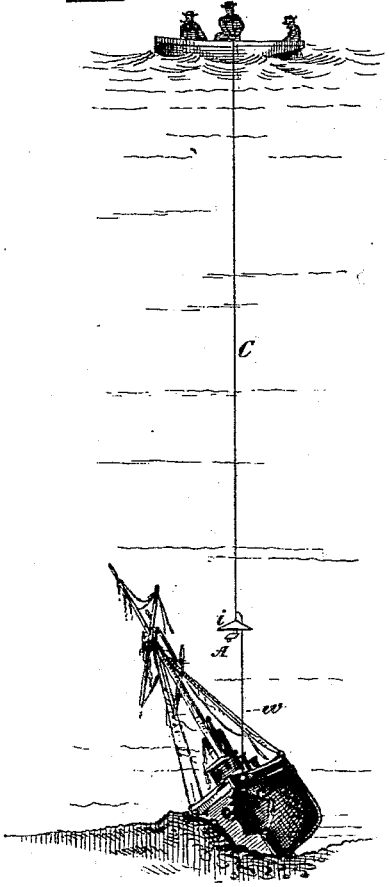
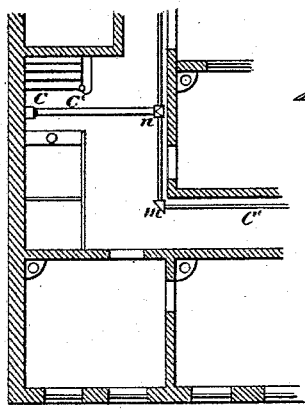
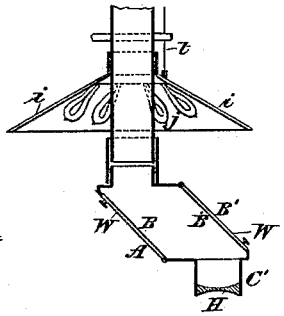
WITNESSES:
Gustave Dieterich
W. A. C. Matthis
INVENTOR
Edward A. Trapp,
BY
Chas. E. Gill
ATTORNEY

United States Patent Office.

EDWARD A. TRAPP, OF BROOKLYN, NEW YORK.

OPTICAL DEVICE FOR THE OBSERVATION OF LOCALITIES BY REFLECTION.

SPECIFICATION forming part of Letters Patent No. 401,229, dated April 9, 1889.

Application filed September 6, 1888. Serial No. 284,748. (No model.)

*To all whom it may concern:*

Be it known that I, EDWARD A. TRAPP, a citizen of the United States, and a resident of Brooklyn, in the county of Kings and State of New York, have invented certain new and useful Improvements in Optical Devices for the Observation of Localities by Reflection, of which the following is a specification.

The invention relates to improvements in optical devices for the observation of localities by reflection, and pertains, particularly, to further developments of and improvements on the invention embraced in Letters Patent of the United States, No. 388,934, issued to me September 4, 1888.

The particular invention sought to be protected hereby will be fully understood from the detailed description hereinafter presented, reference being had to the accompanying drawings, in which—

Figure 1 is a vertical section of a building, showing the application of the invention to the engine-room and various floors thereof and adapted to enable a person on the top floor to observe what is transpiring either in the engine-room or on any one or more of the floors of the building; Fig. 2, a transverse section of a building illustrating the reflectors and tubes, constituting a part of the invention, arranged along the halls of one floor; Fig. 3, a vertical longitudinal section of a reflector-box containing two reflectors and connected with vertical and horizontal branch pipes; Fig. 4, an end view of same; Fig. 5, an enlarged central vertical section of the reflectors and tubes, combined with means for illumination, and adapted for use in submarine explorations; and Fig. 6 a view illustrating the practical application of same to such use.

In the drawings, C designates the main tube, having an eye-piece, D, at one end and a reflector-box, A, at the other, said box having suitable covers, W, permitting the convenient introduction and inspection of the reflectors. The main tube C is provided at desirable intervals with the branch tubes C' and mirrors or reflectors B, one of the latter being supplied for each of said branch tubes, and being secured on a hinged back plate, B', as illustrated more clearly in Fig. 5, in order that it may be turned upward on the pivot a across the branch tube and thus leave an unobstructed view through the main tube C to some other point, or be given a position across said main tube and at equal angles with the axial lines of the tubes, thereby obstructing the view below it and permitting the objects within range of the branch tube to be reflected on it within the line of vision from the eye-piece D.

Various means for moving the mirrors B may be adopted; but I illustrate convenient appliances for this purpose, the same consisting of the arm *b*, secured on the end of the pivot *a*, and being in connection with the weight *d* and rod or cord *e*, the weight, when the cord *e* is released at the eye-piece D, serving to open the reflector from across the branch tube, and the cord *e* affording means whereby the reflector may be again closed over the branch tube, when desired.

In the main tube C will be formed what is substantially a box, *f*, which will constitute a sufficient space for the reflectors B and afford a rest for the upper end of same.

As illustrated in Fig. 1, one of the branch tubes C', with its reflector B, is provided for each floor of the building, and the box A, at the lower end of the tube C, also contains a reflector, B, as described in my Letters Patent hereinbefore referred to. When it is desired to inspect the engine-room from the eye-piece D, all of the branch-tube reflectors should be turned upward against the branch tubes C', in order to leave an unobstructed view to the reflector-box A and enable the observer to clearly see the objects within range of the box reflected upon its mirror. The box A will have a branch tube, C', extending outward therefrom, and the objects within range will, as aforesaid, be reproduced to view on the reflector within the box. If the engine-room should be dark, a reflector, *i*, of ordinary form, and a light, *j*, should be provided, as shown in Fig. 1, whereby to illuminate the surrounding objects and insure their reflection within the box A.

The branch tubes C' at the different floors of the building may lead to any particular locality necessary to be inspected from time to time, and in Fig. 2 I illustrate the branch tubes extending in opposite directions along the halls of the floor. At the points where the tubes are branched off at an angle—as, for instance, in passing around a corner—it will be necessary to provide additional reflector-boxes m n, in the use of which the objects will first be reflected into the box m, then into the box n, and finally from the box n to the reflector B in the main tube C, where it will be visible from the eye-piece D. The branch tubes C' may extend in any desired direction and be connected with any suitable number of branches and reflector-boxes, the mirrors or reflection-surfaces in the boxes being arranged at equal angles with the axial lines of the connecting-tubes, the angles of reflection and angles of incidence being equal.

The eye-piece D may have a convex or concave lens, as described in the Letters Patent hereinbefore referred to; but where the main tube C is of considerable length and used in localities ordinarily difficult of observation a telescope, T, will be supported in and constitute a part of the eye-piece D, as shown more clearly in Fig. 5, and which will enable the observer to clearly see the objects reflected in the various boxes connected with the main tube and to adjust the eye-piece at will without removing it and without difficulty or loss of time.

The terminal ends of the branch tubes extending from the reflector-boxes may be provided with a lens; and I prefer at such points to make use of a double-concave lens, H, as shown enlarged in Fig. 5, which will cause an extended area to be reflected in reduced outline on the reflector-plates within the boxes, thereby enabling the observer at the eye-piece D to inspect considerable space by means of a reflector of small size.

The reflector-box lettered A' (shown in Figs. 3 and 4) contains two mirrors or reflector-plates, B B, with branch tubes C' extending laterally therefrom and one main tube, C, as shown in full lines, or two main tubes side by side—one for each reflector-plate—as indicated by dotted lines, the purpose being to enable the person looking into the one main tube or the two parallel main tubes to observe the different localities within range of the branch tubes extending in opposite directions. The reflectors B B in the box A' will be connected with slides J, which will operate as covers to snugly close the box and permit the reflectors to be introduced and withdrawn at will.

In Figs. 5 and 6 I illustrate the invention as applied to submarine explorations, and in these figures the parts corresponding with like parts in the other figures bear similar reference-letters, and in operation are the same. The reflector-box A, at the lower end of the main tube C, (shown in Figs 5 and 6,) contains two mirrors, B B', and the downwardly extending branch tube or end piece, C', from said box is provided with the double-concave lens H, through which the surrounding objects are reflected on the reflector-plate B', and thence upon the reflector-plate B, where they will be visible from the eye-piece D. If the downwardly-projecting branch tube or end piece, C', extended laterally from the box A, but one reflector, B, would be necessary, as shown at the lower end of the main tube in Fig. 1; but where it is desired that objects directly below and surrounding the box A may be brought to view at the end of a vertical tube the box should have two reflectors.

In the use of the invention for submarine explorations a reflector, $i$, and light $j$ will be made use of, the light in this instance being produced, preferably, by incandescent electric lamps, as shown, $t$ denoting the electric wire.

The main tube C, when used for submarine purposes, may be made in sections for convenience and be projected downward into the water from a boat, and the box A will preferably be supplied with a leg, $w$, to keep it elevated a suitable distance above the objects whose images are to be reflected and observed from the eye-piece D.

What I claim as my invention, and desire to secure by Letters Patent, is—

1. The main tube having the reflector branch tube and reducing-lens at one end and a telescope at the other, combined with means for producing illumination adjacent to said reflector, substantially as set forth.

2. The main tube having an eye-piece at one end and the reflector at the other end, combined with a branch leading from said reflector, provided with a double-concave lens, substantially as set forth.

3. The main tube having a telescope at one end and the reflector at the other end, combined with a branch leading from said reflector and having a double-concave lens, substantially as set forth.

4. The main tube having a branch tube extending therefrom, combined with the weighted movable reflector at the union of the tubes, the reflector being at equal angles with the axial lines of the tubes, substantially as set forth.

Signed at New York, in the county of New York and State of New York, this 5th day of September, A. D. 1888.

EDWARD A. TRAPP.

Witnesses:
 CHAS. C. GILL,
 W. A. C. MATTHIS.